United States Patent [19]

Stephenson

[11] Patent Number: 5,710,953
[45] Date of Patent: Jan. 20, 1998

[54] RECTANGULAR PHOTOGRAPHIC FILM SHEET AND CAMERA FOR USE THEREWITH

[75] Inventor: Stanley Ward Stephenson, Spencerport, N.Y.

[73] Assignee: Eastman Kodak Company, Rochester, N.Y.

[21] Appl. No.: 686,158

[22] Filed: Jul. 24, 1996

Related U.S. Application Data

[60] Provisional application No. 60/007,291, Nov. 9, 1995.
[51] Int. Cl.⁶ .................................................. G03B 41/00
[52] U.S. Cl. .................................................. 396/335
[58] Field of Search .................. 354/110, 114, 354/120, 121; 396/335, 336, 322, 338, 339, 340; 430/495.1, 496

[56] References Cited

U.S. PATENT DOCUMENTS

| | | | |
|---|---|---|---|
| 3,069,987 | 6/1962 | Harrington | 95/36 |
| 3,202,069 | 8/1965 | Cummins et al. | 95/36 |
| 3,323,432 | 6/1967 | Rabanit | 95/18 |
| 4,112,454 | 9/1978 | Harvey | 354/330 |
| 4,140,381 | 2/1979 | Douglas | 354/11 |
| 4,145,131 | 3/1979 | Yevick | 354/115 |
| 4,202,614 | 5/1980 | Harvey | 354/121 |
| 4,283,130 | 8/1981 | Lawson | 354/120 |
| 4,443,100 | 4/1984 | Zamek | 355/76 |
| 4,497,559 | 2/1985 | Maris et al. | 354/316 |
| 4,676,620 | 6/1987 | Pearson et al. | 354/121 |
| 4,712,899 | 12/1987 | Nishimoto | 354/316 |
| 4,860,044 | 8/1989 | Kanai et al. | 354/321 |
| 5,264,882 | 11/1993 | Kameyama et al. | 354/120 |
| 5,363,161 | 11/1994 | Kameyama | 354/114 |
| 5,477,291 | 12/1995 | Mikami et al. | 354/120 |

*Primary Examiner*—Safet Metjahic
*Assistant Examiner*—Christopher E. Mahoney
*Attorney, Agent, or Firm*—Raymond I. Owens

[57] ABSTRACT

A photographic film sheet and a camera for using such film sheet is disclosed. The film sheet has a rectangular shape, a plurality of image areas disposed around the perimeter of the sheet and defining an orthogonal pattern, and the sheet defining a central opening for permitting spin processing of the images on the sheet.

3 Claims, 2 Drawing Sheets

RECTANGULAR PHOTOGRAPHIC FILM SHEET AND CAMERA FOR USE THEREWITH

CROSS REFERENCE TO RELATED APPLICATION

Reference is made to and priority claimed from U.S. Provisional application Ser. No. 60/007,291, filed Nov. 9, 1995, entitled RECTANGULAR PHOTOGRAPHIC FILM SHEET AND CAMERA FOR USE THEREWITH.

FIELD OF THE INVENTION

The invention relates generally to the field of photography, and in particular to specialized film formats and cameras for using such films.

BACKGROUND OF THE INVENTION

Prior art discloses a variety of structures for sheet films for capturing images on photographic films. Said images can be captured as a sequential series of images on a strip of film. These films have come in a variety of formats having designations such as 120, 135, 110 or 126.

Perforations can be added to the films to delimit the imaging areas. For 110 and 126 films, a single perforation is made in the strips to delimit each frame. Newer patents suggest a double perforation for frame definition. In the 135 format, a series of 8 perforations are used to define a frame.

Some formats such as the 120 and 126 formats specify a square image size so that a camera does not need to be turned for a variety of images. This format has been largely abandoned because users prefer an orthogonal print with a horizontal major axis. This format is used in the 110, 135 and more recent proposed formats.

Another format that has been proposed for a photographic sheet is the Disc format shown in FIG. 1.. A film 10 is cut into a circular shape and a series of images 12 is disposed around the perimeter of the film 10. The images 12 on the Disc film have a major and minor axis and are oriented around the disc with the major axis of the image aligned radially. U.S. Pat. No. 4,202,614 show that the Disc is exposed at single exposure station and the wheel is rotated to bring successive images into the image capture mechanism.

U.S. Pat. No. 4,112,454 discloses the development process for Disc negatives. The discs are slid onto a spindle, clamped and spin processed in chemical solutions to develop the film. Key to this process is the opening in the center of the disc, which allows the spindle to pass through a series of discs, allowing a plurality of discs to be processed simultaneously.

Prior art also discloses a series of image composited into a super frame on a strip or on a single sheet. U.S. Pat. Nos. 3,069,987; 3,323,532; and 3,202,069 demonstrate the use of multiple shutter-apertures to create a set of images on a sheet of film. Carefully reading of these patents show that the images are orthogonal aligned and oriented in close proximity to each other.

The shuttering mechanism for these arrayed images can be an array of separate units, such as is found in U.S. Pat. No. 3,069,987. Alternatively, simultaneous images can be captures (U.S. Pat. No. 3,323,432) or in a time-phased sequence (U.S. Pat. Nos. 3,202,069 and 5,264,882). Careful reading shows that the images are close-packed on either a sheet or roll. Also, these images are aligned in a substantially orthogonal array as opposed to the radially oriented array.

This arrangement allows the images to be captured sequentially without film motion between frames, as is required for the disc format. The orthogonal positioning provides a more efficient use of the film area.

SUMMARY OF THE INVENTION

It is an object of the present invention to provide an improved format and camera which overcomes one or more of the problems set forth above.

According to one aspect of the present invention, a photographic film sheet comprises:
  a) a rectangular shape;
  b) a plurality of image areas disposed around the perimeter of the sheet and defining an orthogonal pattern; and
  c) the sheet defining a central opening for permitting spin processing of the images on the sheet.

In another aspect of the invention there is provided a photographic camera device comprising:
  a) means for receiving a photographic film sheet including:
    i) a rectangular shape;
    ii) a plurality of image areas disposed around the perimeter of the sheet and defining an orthogonal pattern; and
    iii) the sheet defining a central opening for permitting spin processing of the images on the sheet; and
  b) a plurality of exposure means each including a lens disposed in an orthogonal pattern and each lens corresponding to an image area on the sheet and for exposing that image area.

The above and other objects of the present invention will become more apparent when taken in conjunction with the following description and drawings wherein identical reference numerals have been used, where possible, to designate identical elements that are common to the drawings.

ADVANTAGEOUS EFFECT OF THE INVENTION

The present invention has the following advantages. A rectangular structure has a smaller area for a given number of pictures than the same images disposed in a circle. Cameras are rectangular for efficient storage. The new format's rectangular format matches the camera shape. The opening in the center allows a series of cards to be disposed on a spindle for spin processing. Other embodiments such as Disc and Motion picture series require that the film sheet be moved for each image/images. This requires that clearance between the film and the frame of the camera. The card is kept stationary in the camera body; permitting the film sheet to be forcibly pressed against the camera body. This improves film to lens alignment.

BRIEF DESCRIPTION OF THE DRAWINGS

FIG. 3b is a sectional view taken along the lines A—A of FIG. 3a; and

DETAILED DESCRIPTION OF THE INVENTION

Figure 1:
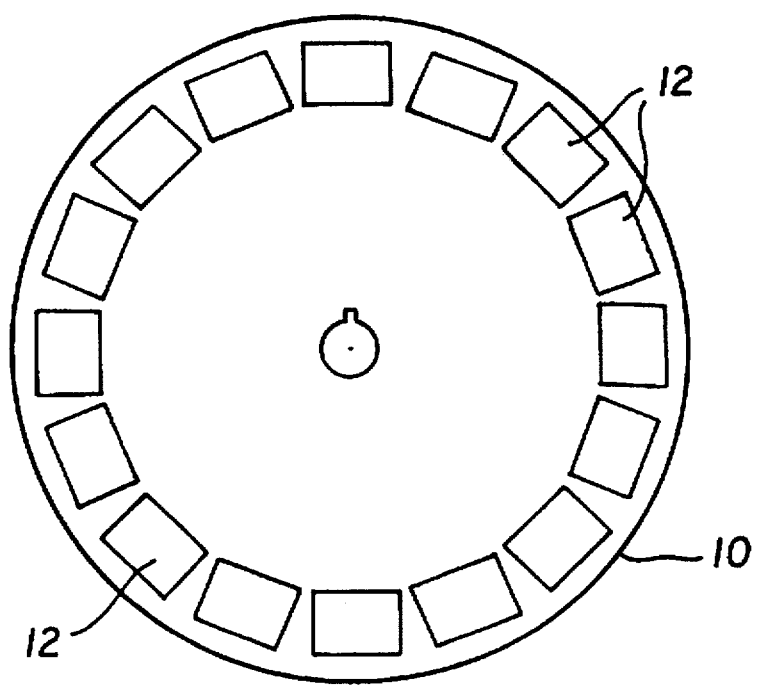
FIG. 1 depicts a prior art Disc film format.
Figure 2:
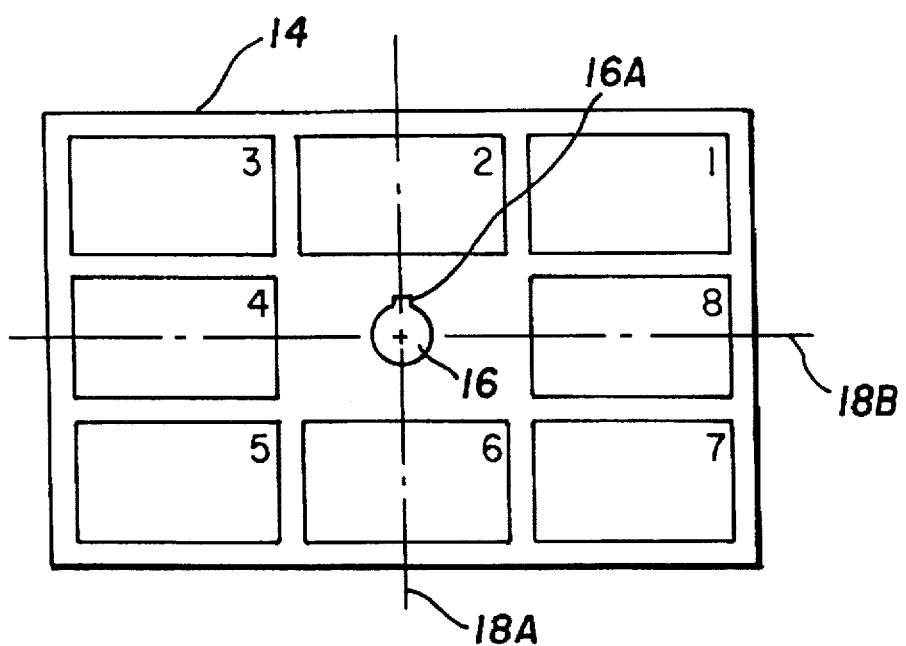
FIG. 2 depicts a photographic film sheet in accordance with the present invention.

Turning now to FIG. 2, there is shown a photographic film sheet 14. The film sheet 14 can be formed from conventional series of layers which are well understood in the art. The photographic film sheet 14 has a rectangular shape. A set of imaging areas are disposed around the perimeter or the periphery of the sheet and defining an orthogonal pattern. Orthogonal oriented images have their major and minor axes aligned in parallel on a predefined X-Y coordinate system.

The photographic film sheet 14 has a central opening 16 for permitting spin processing of the images on the sheet. The opening 16 includes a circular portion and notch structures 16a that defines the orientation of the sheet. This notch permits the sheet 14 to be properly aligned in the camera and also facilitates receiving a mechanical lock on a spindle that permits the card to be spun during development. The photographic film sheet 14 includes a blank central portion 14a. By use of the term "blank" is meant that no image can be formed in this area. Spin processing as disclosed in U.S. Pat. No. 4,112,454 is a processing method for circular sheet film. The Discs are a circular sheet of film with radial oriented images around a hub. The central area has an opening for taking a spindle, with a locking detail that defines a first image and is also used to lock the Disc to the spindle. A series of Discs is stacked on the spindle, and the spindle assembly is plunged into chemical baths and spun to chemically develop the film. The hole and locking detail allow the a plurality of the Disc units to be stacked and the locking detail transfers the rotation of the spindle to the Discs.

In one preferred embodiment, the photographic film sheet 14 can be cut to define a 50 mm by 75 mm area. The image areas can be 14 mm by 20.8 mm and aligned so that 8 image areas are disposed on the sheet. Three images are disposed across the top and bottom, and two images are disposed on the side of the sheet, leaving the center area free.

Figure 3A:
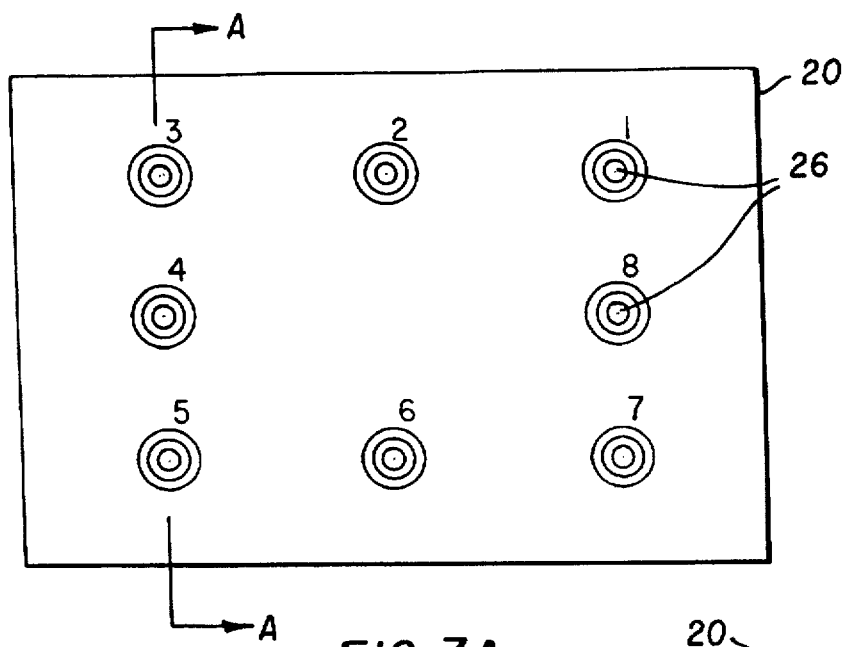
FIG. 3a depicts a front view of a camera which uses the film format of FIG. 2.
Figure 3B:
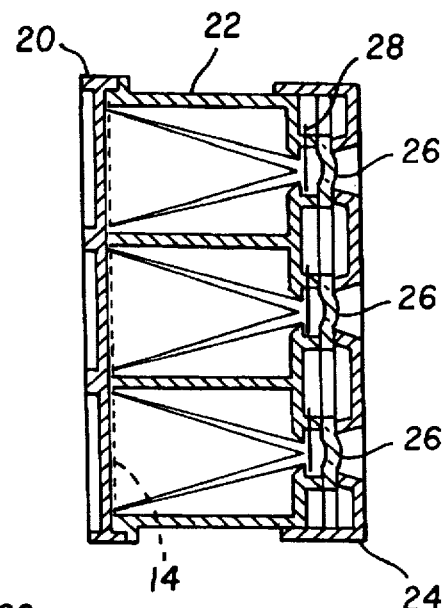
Figure 4:
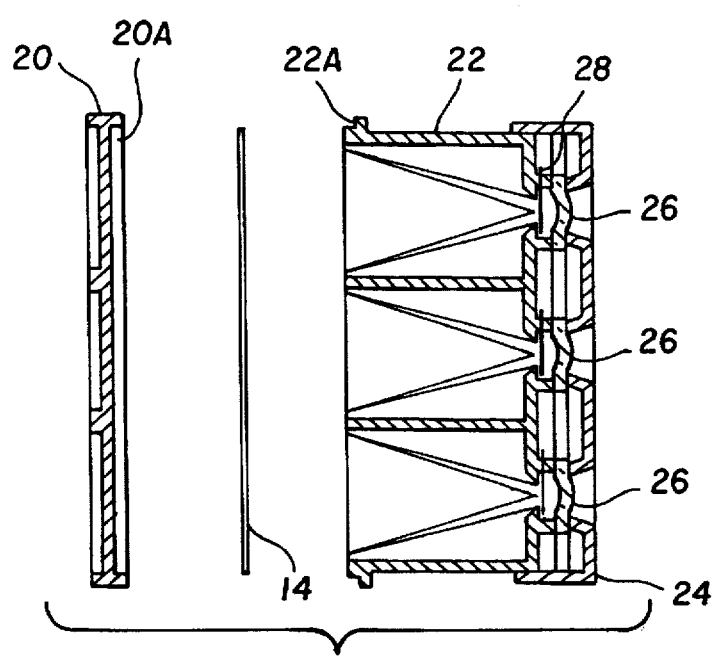
FIG. 4 is a side exploded view of the camera and photographic film sheet.

A camera is shown in FIG. 3a and FIG. 3b which uses the film sheets of FIG. 2. The camera 20 is preferably a sealed unit and includes a frame 22. The photographic film sheet 14 is secured onto the frame 22 by means of a back cover 20. FIG. 4 is an exploded view of the camera. A series of lenses 26 and a series of shutters 28 are adapted to expose the image areas as is well known in the art (see the shuttering mechanisms discussed above) have been disposed in the front of the camera. The shutters will be understood to be individually operated by a mechanism not shown. The photographic film sheet 14 is placed over the egg crate structure formed in the camera body. These cells prevent light from one captured image from impinging on the image area of other images. A back cover 20 is used to press the film to the camera body 22 in a light tight manner. Baffle 22A formed in the body provides a first baffling means that prevents light from exposing the film. In this embodiment recess 20A formed in the back cover acts as a cup that surrounds the edges of the film while baffle 22A in the camera body. A simple labyrinth is formed that will exclude ambient light from exposing the film. Further labyrinth can be formed to the degree that is needed to prevent ambient light exposure. In another embodiment, ultrasonic energy is applied to the joint between plastic elements 20A and 22A to melt the plastic and fuse the two structures in light-tight conformance. The camera is particularly suited for use as a so-called single use camera which refers to the fact that the camera-film can be built in a factory, used by a customer and the film separated from the camera body for development after exposure.

Summarizing, a rectangular film sheet format is shown which includes a plurality of orthogonal image areas around its perimeter. This particular film format is particularly useful in single use cameras which can have special exposures structures for each image area on the photographic film sheet 14.

The invention has been described in detail with particular reference to certain preferred embodiments thereof, but it will be understood that variations and modifications can be effected within the spirit and scope of the invention.

PARTS LIST

10 Disc
12 image area
14 photographic film sheet
14a blank central portion
16 central opening
16a notch structures
18a major axis
18b minor axis
20 camera
20a recess
22 frame
22a baffle
24 cover
26 lenses
28 shutter

I claim:

1. A photographic film sheet comprising:
   a) a rectangular shape;
   b) a plurality of image areas disposed around the perimeter of the sheet, with all of the images being arranged to define an orthogonal pattern; and
   c) the sheet defining a central opening for permitting spin processing of the images on the sheet.

2. A photographic film sheet as set forth in claim 1 wherein eight image areas are disposed peripherally on the sheet, three on the top and three on the bottom sides and one each on the sides of the sheet with all of the imaging areas having a major axis parallel to the major axis of said sheet.

3. A photographic camera device comprising:
   a) means for receiving a photographic film sheet including:
      i) a rectangular shape;
      ii) a plurality of image areas disposed around the perimeter of the sheet, with all of the image being arranged to define an orthogonal pattern; and
      iii) the sheet defining a central opening for permitting spin processing of the images on the sheet; and
   b) a plurality of exposure means each including a lens disposed in an orthogonal pattern and each lens corresponding to an image area on the sheet and for exposing that image area.

* * * * *